(12) United States Patent
Chiang

(10) Patent No.: US 6,801,485 B2
(45) Date of Patent: Oct. 5, 2004

(54) METHOD OF LAYER JUMP BRAKING CONTROL FOR AN OPTICAL DRIVE

(75) Inventor: Shih-Chung Chiang, Taipei (TW)

(73) Assignee: Ali Corporation, Taipei Hsien (TW)

( * ) Notice: Subject to any disclaimer, the term of this patent is extended or adjusted under 35 U.S.C. 154(b) by 355 days.

(21) Appl. No.: 10/121,287

(22) Filed: Apr. 12, 2002

(65) Prior Publication Data

US 2003/0112720 A1 Jun. 19, 2003

(30) Foreign Application Priority Data

Dec. 13, 2001 (TW) .................................. 90130916 A

(51) Int. Cl.[7] .............................................. G11B 7/00
(52) U.S. Cl. ................................................. 369/44.29
(58) Field of Search ........................ 369/44.27, 44.29, 369/94, 44.25, 44.26, 44.31, 44.34

(56) References Cited

U.S. PATENT DOCUMENTS

| | | | | |
|---|---|---|---|---|
| 5,999,503 A | * | 12/1999 | Tateishi et al. | 369/44.29 |
| 6,061,310 A | * | 5/2000 | Iida | 369/44.27 |
| 6,151,280 A | * | 11/2000 | Naohara et al. | 369/44.27 |
| 6,178,145 B1 | * | 1/2001 | Hayashi et al. | 369/44.29 |
| 6,208,597 B1 | * | 3/2001 | Yoshimi | 369/44.29 |
| 6,240,054 B1 | * | 5/2001 | Takeya et al. | 369/44.29 |
| 6,633,522 B2 | * | 10/2003 | Ryu | 369/44.29 |

FOREIGN PATENT DOCUMENTS

| | | | |
|---|---|---|---|
| JP | 11250468 A | * | 9/1999 |
| JP | 2001319344 A | * | 11/2001 |

* cited by examiner

*Primary Examiner*—Thang V. Tran
(74) *Attorney, Agent, or Firm*—Ladas & Parry LLP

(57) ABSTRACT

A method of controlling an optical drive to perform a braking process in a layer jump process. The optical drive has a vertically movable pickup head, a preamplifier, a controller, and a low pass filter. The controller receives a focus error signal produced by the preamplifier to produce a focus control signal, and sends the focus control signal to the low pass filter to produce a layer distance balancing signal, so that the pickup head is controlled by the layer distance balancing signal to perform the layer jump process. The method of the present invention comprises the steps of: performing the braking process in accordance with a braking signal and the layer distance balancing signal when the focus error signal reaches a braking start point; and performing a closed-loop focusing control process when the focus error signal reaches a closed-loop focusing control point.

8 Claims, 7 Drawing Sheets

METHOD OF LAYER JUMP BRAKING CONTROL FOR AN OPTICAL DRIVE

BACKGROUND OF THE INVENTION

1. Field of the Invention

The present invention relates to a method of braking process control in a layer jump process, and particularly to a method of controlling an optical drive's performance of a braking process in a layer jump process.

2. Description of the Related Art

Generally, an optical disk can be classified into two categories according to the number of layers. That is, an optical disk can be a single layer disk such as a CD disk, a VCD disk or a DVD-5 disk, DVD-10 disk, or a dual layer disk such as a DVD-9 disk or a DVD-18 disk. When an optical drive reads the dual layer DVD disk, the pickup head of the optical drive moves its laser spot between the two layers. As a result, it is necessary to involve a layer jump process of the optical drive in order to move the laser spot from the initial layer to the target layer.

Conventionally, a layer jump control apparatus is applied for controlling a layer jump process of an optical drive. An example of the conventional layer jump control apparatus is disclosed in the Taiwanese patent application No. 90125930 "LAYER JUMP CONTROL FOR AN OPTICAL DRIVE", filed on Oct. 19, 2001. The conventional layer jump control apparatus has a driving device, a pickup head, a preamplifier, a controller and a low pass filter. In the conventional layer jump control apparatus, the driving device outputs the driving force; the pickup head has a lens and a voice coil motor, and drives the voice coil motor in accordance with a driving force to vertically move the lens; the preamplifier produces a focus error signal; the controller receives the focus error signal and produces a focus control signal; and the low pass filter receives the focus control signal and produces a layer distance balancing signal. When the optical drive does not perform the layer jump process, the focus control signal is used to determine the driving force. When the optical drive performs the layer jump process, the layer distance balancing signal, a kicking signal and a braking signal are used to determine the driving force of the layer jump process.

The layer jump process performed in the aforementioned conventional layer jump control apparatus sequentially includes a kicking process KP, a holding process HP, a braking process BP, and a waiting process WP. Control of these processes is further described in reference to FIG. 1 and FIG. 2.

Referring to FIG. 1 and FIG. 2, the focus error signal FE produced by the preamplifier is maintained at a fixed value before the layer jump process is performed, as shown in FIG. 1. At this time, the focus control signal FC produced by the controller controls the driving device to send the driving force that maintains the lens in the initial layer; that is, the laser spot is maintained in the initial layer, such as layer 0 in FIG. 1. It should be noted that the focus control signal FC changes due to layer distance variation or the disk wobbling of the DVD disk, so that the layer distance balancing signal LB produced by the low pass filter is kept changing and updating (step S205).

At this time, if a pulse of layer jump control signal LC is applied, the layer jump process is activated (step S210), and the low pass filter stops producing and updating the layer distance balancing signal LB in order to keep the latest updated layer distance balancing signal LB (step S220) at a fixed value. Then, the layer distance balancing signal LB is sent to the driving device in coordination with the kicking signal KS and the layer distance balancing signal LB to perform the kicking process KP (step S230) as shown in FIG. 1. When the kicking process KP is completed, the kicking signal KS is eliminated so that only the layer distance balancing signal LB is sent to the driving device for determination of the driving force, thus performing the holding process HP (step S240). In the holding process HP, the laser spot keeps moving toward the target layer, such as layer 1 in FIG. 1.

The braking point F3 of the focus error signal FE is used to determine if the holding process HP should be completed. As shown in FIG. 1, when the focus error signal FE reaches the checking point F3, a braking signal BS is applied together with the layer distance balancing signal LB to be sent to the driving device to perform the braking process BP (step S250) for a certain period of time. When the braking process BP is completed, the waiting process WP is applied (step S260) in correspondence to the layer distance balancing signal LB. Thus, the waiting process WP is completed, which means that the layer jump process is completed (step S270), and the closed-loop focusing control process is re-activated. Finally, the low pass filter restarts producing and updating the layer distance balancing signal LB (step S280).

It should be noted that dual layer disks, such as DVD-9 or DVD-18 disks, generally have a relatively smaller linear controlled area, and a layer distance with an even larger variation. Therefore, if the optical drive applies the driving force with the same intensity in each dual layer disk, it is possible that layer jump failure might occur in dual layer disks. In addition, a dual layer disk may be irregularly manufactured or printed in the disk printing process, or be placed in an inaccurate position in the optical drive, so that the disk wobbles in rotating for the pickup head to read. If the disk wobbles, the disk layers sway up and down in relation to the natural equilibrium position of the lens, which reduces the stability of the layer jump process and may cause failure. These drawbacks are partially solved with the aforementioned conventional layer jump control apparatus, which increases the stability of the layer jump process.

However, in the layer jump process, the braking process BP is performed for a certain fixed period of time before the waiting process WP, and the waiting process WP is completed when the focus error signal FE reaches a checking point F4. The conventional layer jump control apparatus stabilizes the layer jump process performed in each dual layer disk, but the layer jump velocity of the pickup head varies in the braking process BP of each dual layer disk. As a result, if the layer jump velocity of the pickup head is too fast at the end of the certain fixed period of time of the braking process BP, there is risk that the pickup head might move beyond the edge of the linear controlled area of the layer 1, which induces to failure of the focusing control.

SUMMARY OF THE INVENTION

In view of the above-mentioned drawbacks, an object of the present invention is to disclose a method of braking process control in the layer jump process, which reduces the possibility of failure in the braking process.

Further, another object of the present invention is to disclose a method of braking process control in the layer jump process, in which the closed-loop focusing control process is re-activated earlier when the layer jump velocity of the pickup head is fast at the end of the certain fixed period of time of the braking process BP.

The present invention discloses a method of controlling an optical drive to perform a braking process in a layer jump process. The optical drive has a vertically movable pickup head, a preamplifier, a controller, and a low pass filter. The controller receives a focus error signal produced by the preamplifier to produce a focus control signal, and sends the focus control signal to the low pass filter to produce a layer distance balancing signal, so that the pickup head is controlled by the layer distance balancing signal to perform the layer jump process. The method of the present invention comprises the steps of: performing the braking process in accordance with a braking signal and the layer distance balancing signal when the focus error signal reaches a braking start point; and performing a closed-loop focusing control process when the focus error signal reaches a closed-loop focusing control point.

The above-mentioned method of the present invention preferably comprises a step of performing a waiting process in accordance with the layer distance balancing signal when the braking process is performed for a predetermined period of time and the focus error signal does not reach the closed-loop focusing control point in the predetermined period of time.

In the above-mentioned method of the present invention, the closed-loop focusing control point is preferably determined by three quarters of an extreme value of the focus error signal. Further, the optical drive can be a DVD drive, the controller can be an equalizer, and the layer distance balancing signal can be a direct current voltage level of the focus control signal. Further, the layer distance balancing signal can be used to determine a holding force, and the braking signal can be used to determine a braking force.

The present invention is characterized in that the closed-loop focusing control process is re-activated when the focus error signal reaches a closed-loop focusing control point, so that failure of focusing control does not occur even if the layer jump velocity of the pickup head is very fast at the end of the certain fixed period of time of the braking process BP. Thus, it is much easier to control the layer jump process, particularly the braking process; and the possibility of failure in the layer jump process is further reduced.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
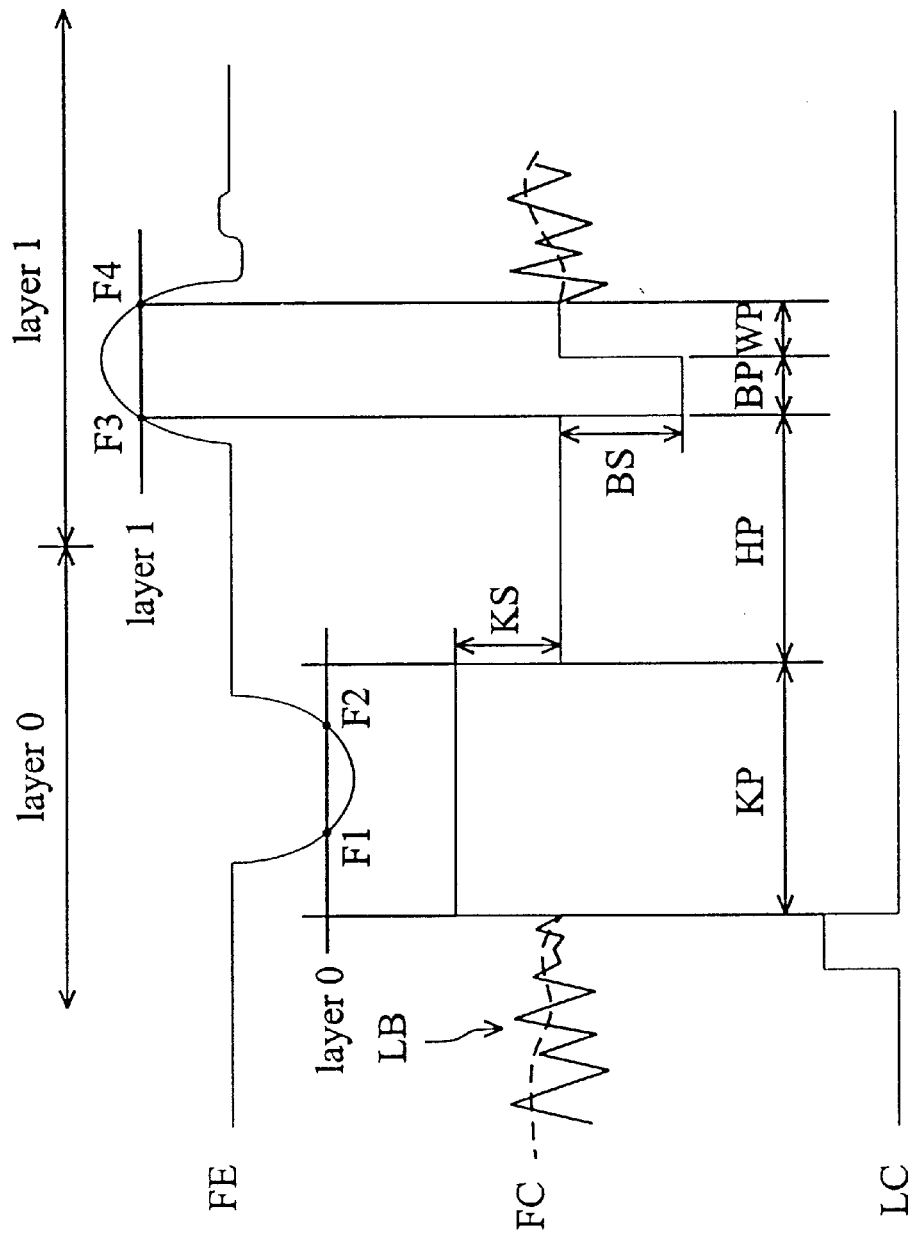
FIG. 1 is a schematic view showing the focus error signal FE and the focus control signal FC in the conventional layer jump process.
Figure 2:
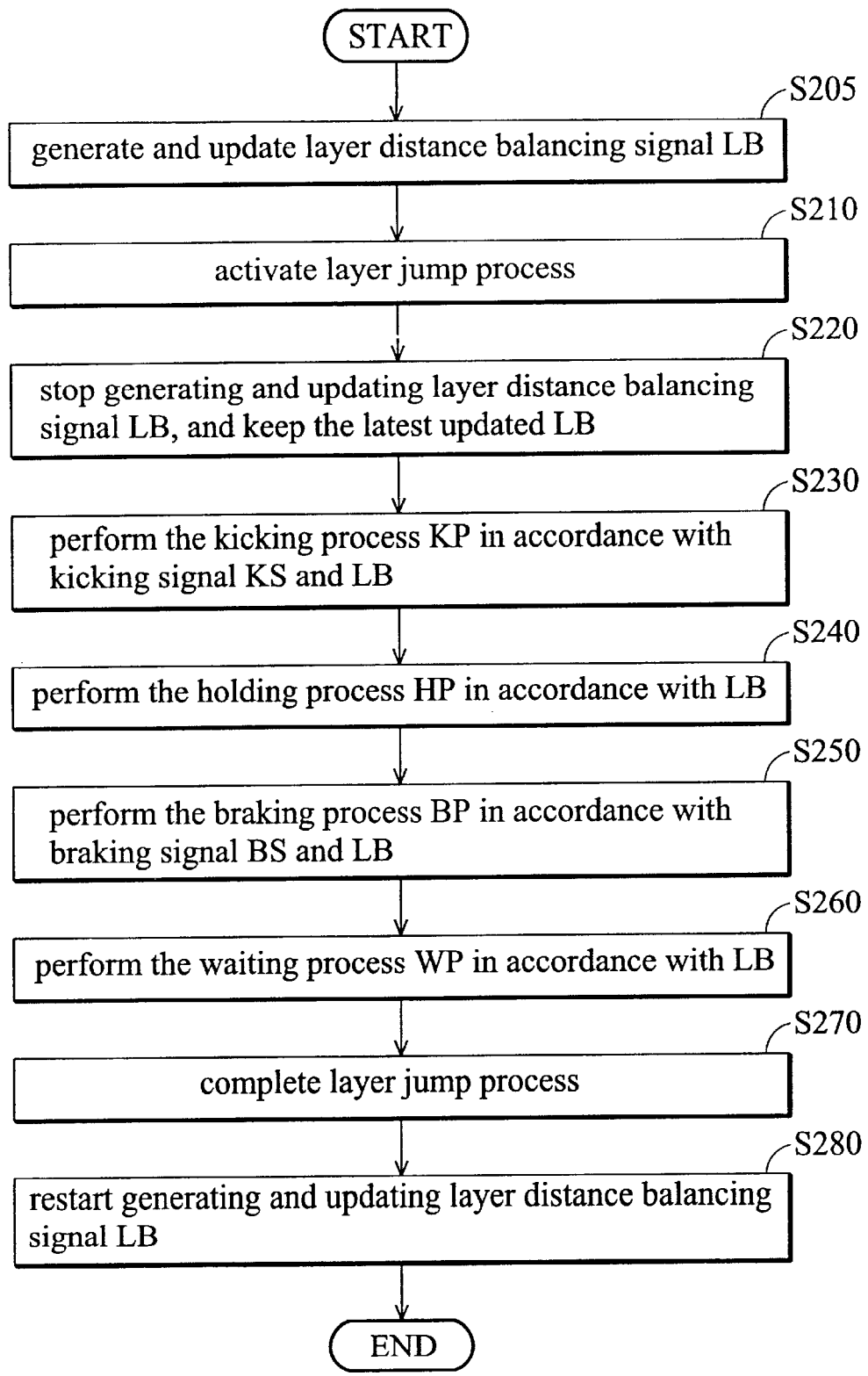
FIG. 2 is a flow chart showing the layer jump process performed in the conventional layer jump control apparatus of an optical drive.
Figure 3A:
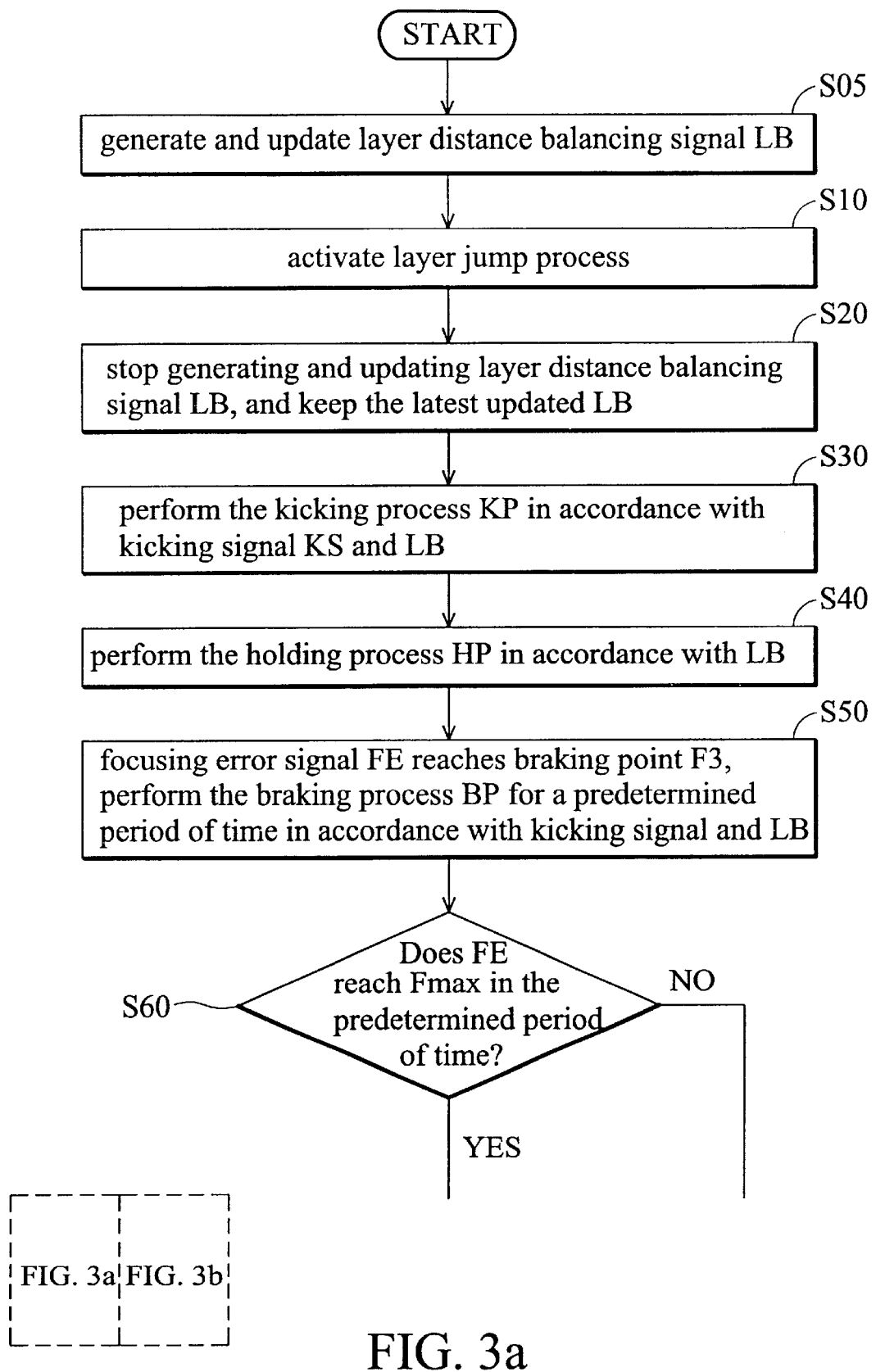
FIG. 3a and FIG. 3b shows a flow chart of the layer jump process in which the method of braking process control of the present invention is applied.
Figure 3B:
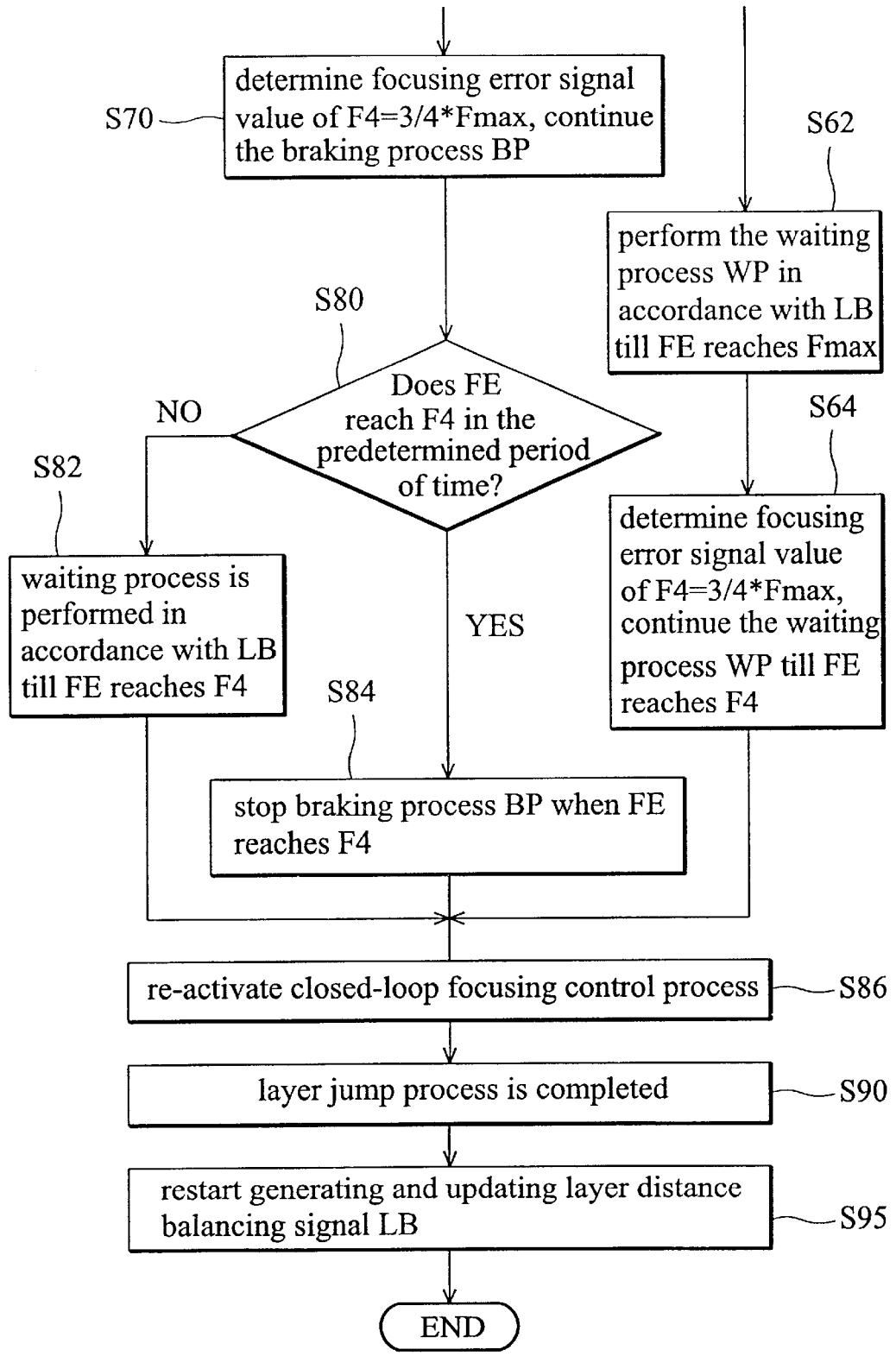

A layer jump process in which the method of braking process control of the present invention is hereinafter described in detail in reference to FIG. 3a and FIG. 3b.

The present invention discloses a method of controlling an optical drive to perform a braking process in a layer jump process. The optical drive, such as a DVD drive, has a vertically movable pickup head, a preamplifier, a controller, and a low pass filter. The controller can be an equalizer, which receives a focus error signal FE produced by the preamplifier to produce a focus control signal FC, and sends the focus control signal FC to the low pass filter to produce a layer distance balancing signal LB, such as a direct current voltage level of the focus control signal FC, so that the pickup head is controlled by the layer distance balancing signal LB to perform the layer jump process.

In the optical drive, the layer distance balancing signal LB produced by the low pass filter is kept changing and updating (step S05) until the layer jump process is activated (step S10). At this time, the low pass filter stops producing and updating the layer distance balancing signal LB in order to keep the latest updated layer distance balancing signal LB (step S20) at a fixed value. Then, the layer distance balancing signal LB is sent in coordination with the kicking signal KS and the layer distance balancing signal LB to perform the kicking process KP (step S30). When the kicking process KP is completed, the kicking signal KS is eliminated so that only the layer distance balancing signal LB is sent to the driving device for determination of the driving force, thus performing the holding process HP (step S40).

Then, a braking signal BS to determine the braking force is applied together with the layer distance balancing signal LB when the focus error signal FE reaches the braking point F3, in order to perform the braking process BP (step S50) for a predetermined period of time. In the braking process BP, three possible cases might occur in accordance with the layer jump velocity of the pickup head. These three cases are respectively disclosed in the following three embodiments.

First Embodiment

Figure 4:
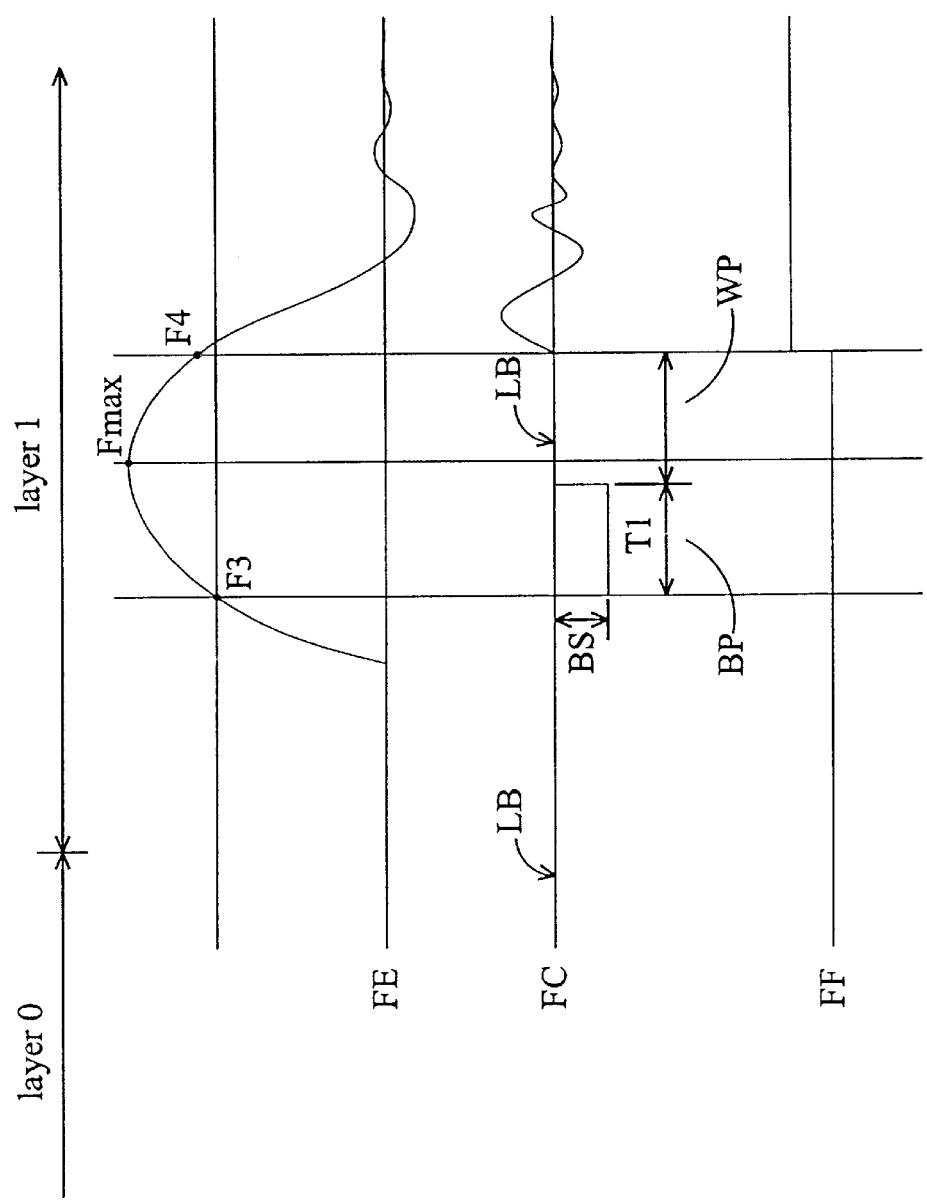
FIG. 4 is a schematic view showing the focus error signal FE and the focus control signal FC in the braking process BP performed in the first embodiment of the present invention.

The first embodiment is shown in reference to FIG. 4, in which the pickup head has a slow layer jump velocity, and the braking process BP is performed for a predetermined period of time T1 in step S50. In this case, the focus error signal FE is continuously detected in the braking process BP to recognize if the focus error signal FE reaches a maximum value Fmax (step S60). In this embodiment, the pickup head has a slow layer jump velocity, so that the focus error signal FE does not reach the maximum value Fmax in the period of time T1. When the braking process BP is completed at the end of T1, the braking signal BS is eliminated, so that only the layer distance balancing signal LB is sent for determination of the driving force, thus performing the waiting process WP until the focus error signal FE reaches the maximum value Fmax (step S62).

When the focus error signal FE reaches the maximum value Fmax, a closed-loop focusing control point F4 is determined by three quarters of the maximum value Fmax of the focus error signal FE, and the waiting process WP continues (step S64) until the focus error signal FE reaches the closed-loop focusing control point F4. Then, the closed-loop focusing control process is reactivated (step S86) and the layer jump process is completed (step S90). Finally, the low pass filter restarts producing and updating the layer distance balancing signal LB (step S95).

It should be noted that, in this embodiment, the focus error signal FE does not reach the maximum value Fmax in the period of time T1 of the braking process BP. Accordingly, the closed-loop focusing control point F4, which requires the maximum value Fmax for determination, is not determined in the braking process BP.

Second Embodiment

Figure 5:
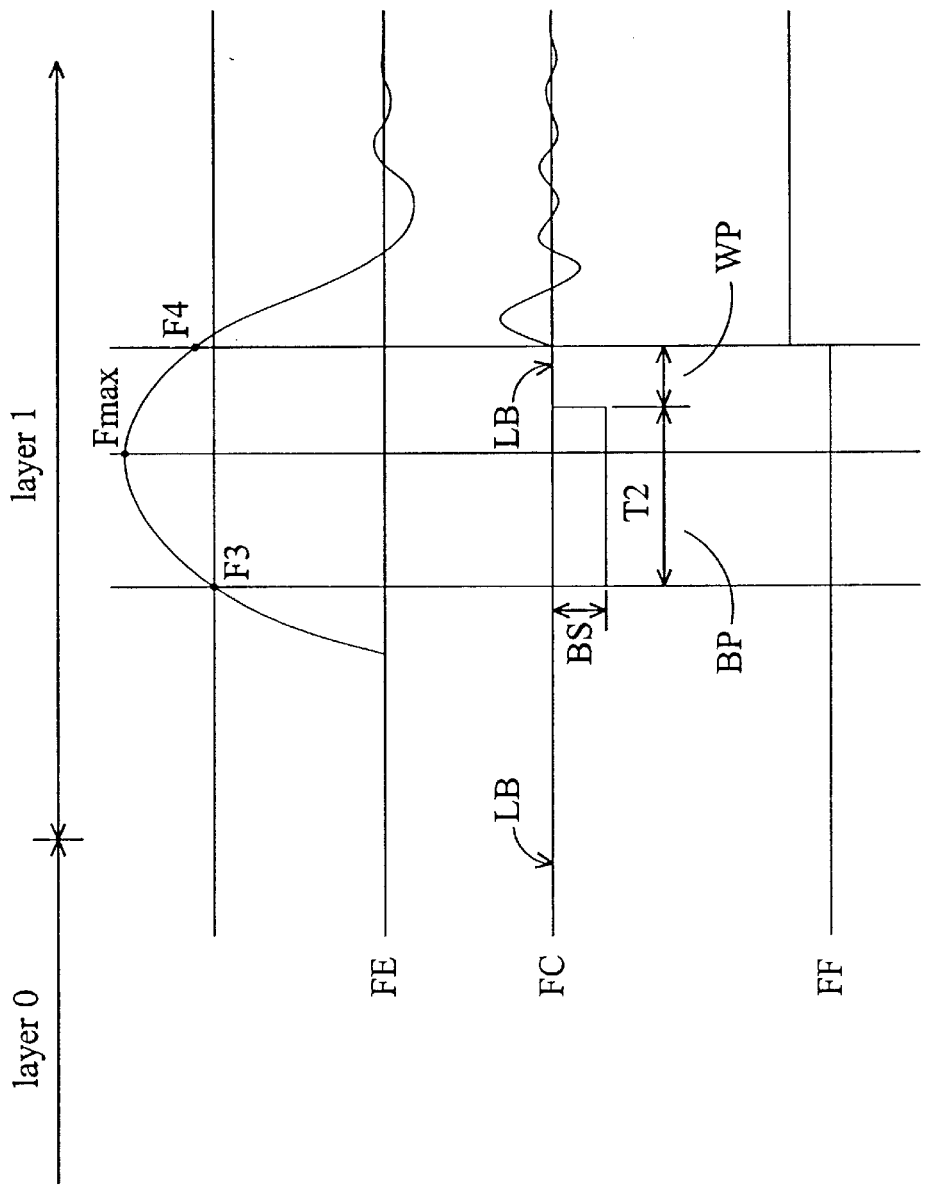
FIG. 5 is a schematic view showing the focus error signal FE and the focus control signal FC in the braking process BP performed in the second embodiment of the present invention.

The second embodiment is shown in reference to FIG. 5, in which the pickup head has a moderate layer jump velocity, and the braking process BP is performed for a predetermined period of time T2 in step S50. In this case, the focus error signal FE is continuously detected in the braking process BP to recognize if the focus error signal FE reaches a maximum value Fmax (step S60). In this embodiment, the pickup head has a moderate layer jump velocity, which is faster in comparison to the case of the First embodiment, so that the focus error signal FE reaches the maximum value Fmax in the period of time T2. At this time, the closed-loop focusing control point F4 can be determined by three quarters of the maximum value Fmax of the focus error signal FE, and the braking process BP continues (step S70).

Then, the focus error signal FE is further continuously detected in the braking process BP to recognize if the focus error signal FE reaches the closed-loop focusing control point F4 (step S80). In this embodiment, the pickup head has a moderate layer jump velocity, so that the focus error signal FE does not reach the closed-loop focusing control point F4 in the period of time T2. When the braking process BP is completed at the end of T2, the braking signal BS is eliminated, so that only the layer distance balancing signal LB is sent for determination of the driving force, thus performing the waiting process WP until the focus error signal FE reaches the closed-loop focusing control point F4 (step S82). Then, the closed-loop focusing control process is re-activated (step S86) and the layer jump process is completed (step S90). Finally, the low pass filter restarts producing and updating the layer distance balancing signal LB (step S95).

In this embodiment, the focus error signal FE reaches the maximum value Fmax in the period of time T2 of the braking process BP, which differs from the First embodiment. Accordingly, the closed-loop focusing control point F4, which requires the maximum value Fmax for determination, is determined in the braking process BP.

Third Embodiment

Figure 6:
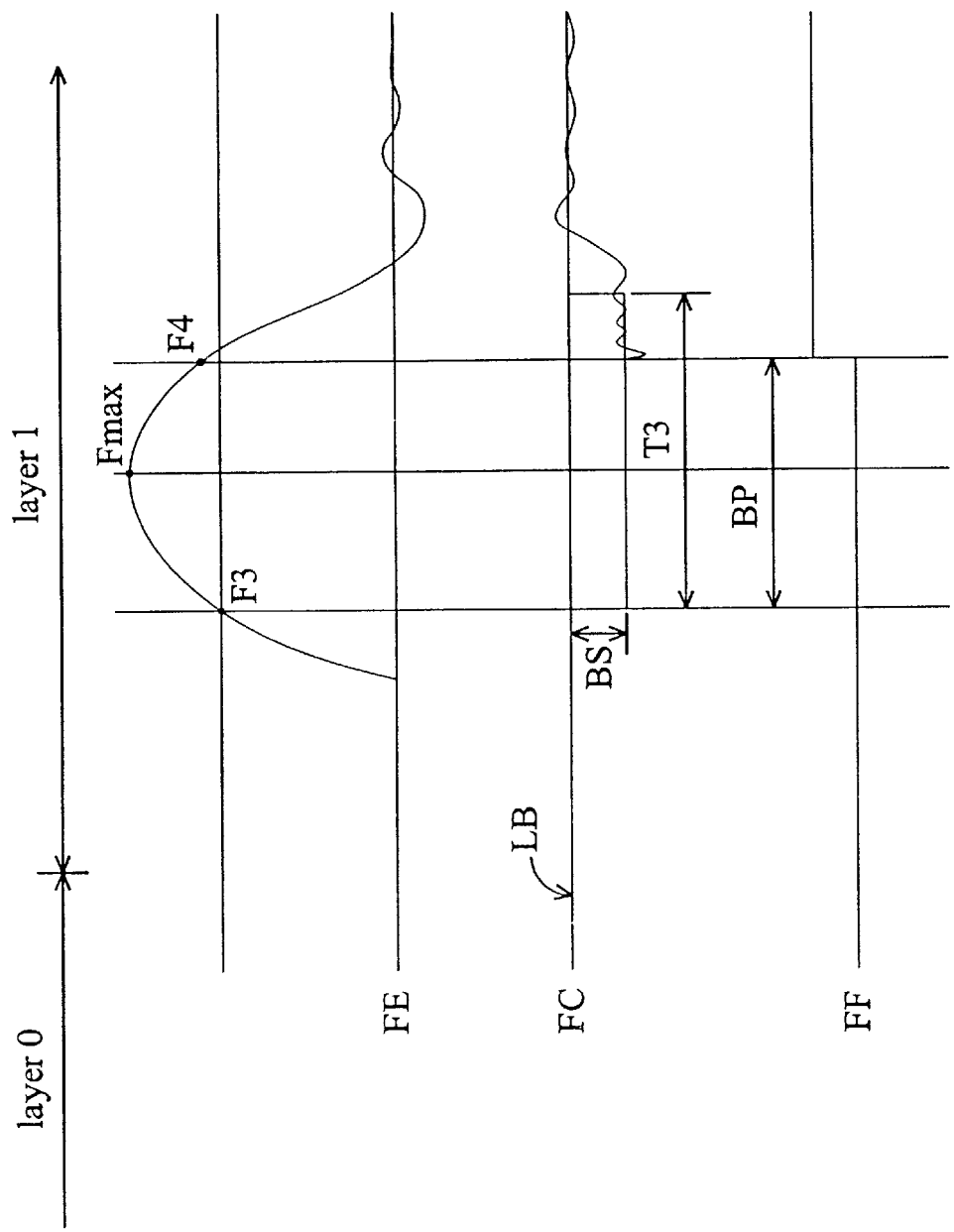
FIG. 6 is a schematic view showing the focus error signal FE and the focus control signal FC in the braking process BP performed in the third embodiment of the present invention.

The third embodiment is shown in reference to FIG. 6, in which the pickup head has a fast layer jump velocity, and the braking process BP is performed for a predetermined period of time T3 in step S50. In this case, the focus error signal FE is continuously detected in the braking process BP to recognize if the focus error signal FE reaches a maximum value Fmax (step S60). In this embodiment, the pickup head has a fast layer jump velocity, which is even faster in comparison to the case of the First embodiment and the Second embodiment, so that the focus error signal FE reaches the maximum value Fmax in the period of time T3. At this time, the closed-loop focusing control point F4 can be determined by three quarters of the maximum value Fmax of the focus error signal FE, and the braking process BP continues (step S70).

Then, the focus error signal FE is further continuously detected in the braking process BP to recognize if the focus error signal FE reaches the closed-loop focusing control point F4 (step S80). In this embodiment, the pickup head has a fast layer jump velocity, so that the focus error signal FE reaches the closed-loop focusing control point F4 in the period of time T3 as shown in FIG. 6. At this time, the braking process BP is interrupted regardless of T3 (step S84), and the waiting process WP is skipped in order to perform the layer jump process smoothly. Thus, the closed-loop focusing control process is re-activated in advance (step S86) and the layer jump process is completed (step S90). Finally, the low pass filter restarts producing and updating the layer distance balancing signal LB (step S95).

In this embodiment, the pickup head has a fast layer jump velocity, and the focus error signal FE reaches the closed-loop focusing control point F4 before the end of the predetermined period of time T3 of the braking process BP, which differs from the First embodiment and the Second embodiment. Therefore, it is necessary to interrupt the braking process BP before the end of the predetermined period of time T3 and to skip the waiting process WP, so that the pickup head does not move beyond the edge of the linear controlled area of layer 1.

It should be noted that the above-mentioned method of braking process control of the layer jump process is described in embodiments in which the pickup head moves from layer 0 to layer 1. The method of the present invention is equally applicable in the layer jump process from layer 1 to layer 0.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of controlling an optical drive to perform a braking process in a layer jump process, wherein the optical drive comprises a vertically movable pickup head, a preamplifier, a controller, and a low pass filter, the controller receiving a focus error signal produced by the preamplifier to produce a focus control signal, and sending the focus control signal to the low pass filter to produce a layer distance balancing signal, the pickup head being controlled by the layer distance balancing signal to perform the layer jump process, the method comprising the steps of:

performing the braking process in accordance with a braking signal and the layer distance balancing signal when the focus error signal reaches a braking start point; and performing a closed-loop focusing control process when the focus error signal reaches a closed-loop focusing control point.

2. The method according to claim 1, further comprising a step of:

performing a waiting process in accordance with the layer distance balancing signal when the braking process is performed for a predetermined period of time and the focus error signal does not reach the closed-loop focusing control point in the predetermined period of time.

3. The method according to claim 1, wherein the closed-loop focusing control point is determined by three quarters of an extreme value of the focus error signal.

4. The method according to claim 1, wherein the optical drive is a DVD drive.

5. The method according to claim 1, wherein the controller is an equalizer.

6. The method according to claim 1, wherein the layer distance balancing signal is a direct current voltage level of the focus control signal.

7. The method according to claim 1, wherein the layer distance balancing signal is suited to determine a holding force.

8. The method according to claim 1, wherein the braking signal is suited to determine a braking force.

* * * * *